May 3, 1960
A. J. GRISH
2,934,851
FLY SWATTER
Filed Feb. 27, 1959
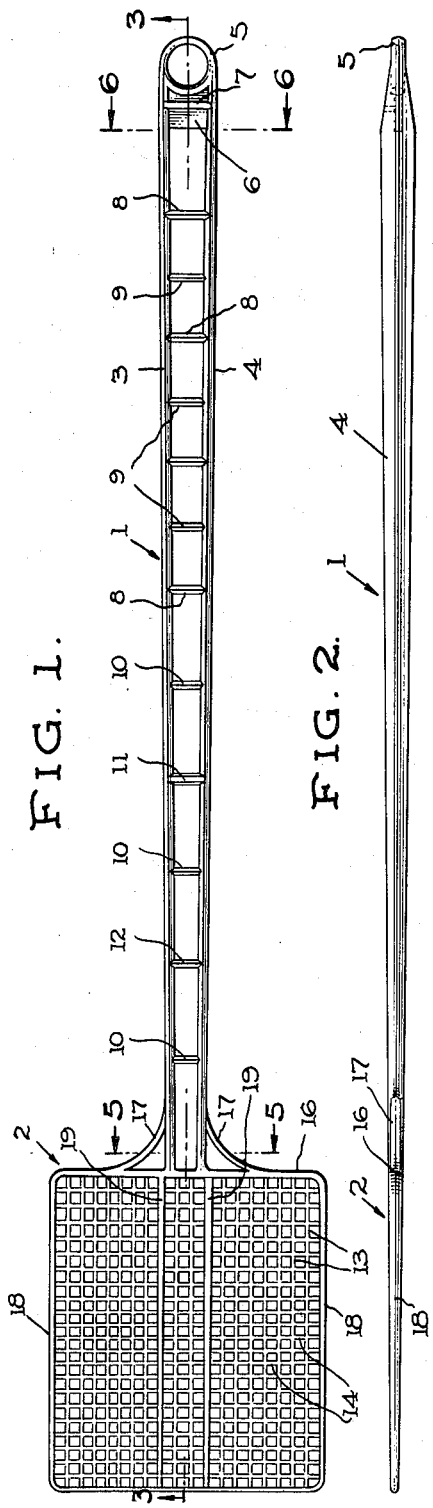
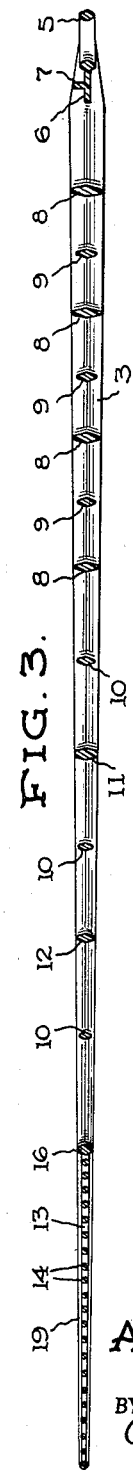
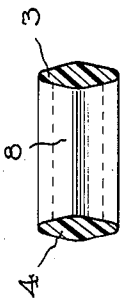
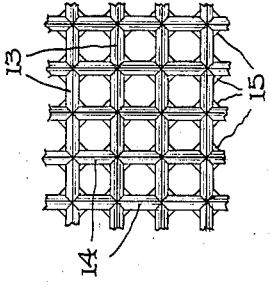
INVENTOR
ANTHONY J. GRISH
BY Cameron, Kerkam & Sutton
ATTORNEYS

# United States Patent Office 2,934,851
Patented May 3, 1960

2,934,851

FLY SWATTER

Anthony J. Grish, Schererville, Ind.

Application February 27, 1959, Serial No. 795,977

6 Claims. (Cl. 43—137)

This invention relates to fly swatters and more particularly to such devices which are made in one piece and entirely of molded thermoplastic material, such as nylon, for example.

The purpose and manner of use of a fly swatter dictate its structural form. It should, of course, be light in weight for ease of handling. A relatively long handle is desirable, partly in order to reach to otherwise inaccessible points, but also in order that a simple flick of the wrist will cause the head or blade of the swatter to travel at high speed. Of course, the head should permit air to pass through readily to minimize air resistance to the stroke and to avoid blowing the insect away before being hit. The end of the handle should be relatively stiff and sized to afford a firm grip for the user, whereas toward the head or blade and in the head itself more flexibility is desirable and preferably also enough resilience for the user to whip the head rapidly toward a surface, the handle bending beyond the hand grip during the effective stroke of the swatter and then springing back to its normal straight condition. Flexibility also minimizes the risk of breakage of or damage to the surface or object on which the insect may be resting when swatted. Above all, it is essential that such a device be capable of quantity production at nominal cost.

It has been found that the foregoing requirements can be met very satisfactorily by fly swatters of the construction described hereinafter and made entirely of molded thermoplastic material in one piece. Various well known and readily available thermoplastic synthetic resins can be used for this purpose according to known pressure molding techniques. In injection molding, for example, a charge of heat-softened thermoplastic material is forced under pressure into a hollow mold and allowed to set or freeze therein, after which the pressure is discontinued, the mold opened, and the finished article removed. Nylon plastics and molding powders are especially suited for the purpose because of their outstanding toughness, resistance, abrasion resistance, ability to be molded in thin sections, etc. Swatters made from nylon plastic in its natural color have an attractive translucent creamy white appearance, are light, strong and durable, and have the known and inherent properties and qualities of nylon.

The structural features and the resquirements of quantity production mentioned above cannot be met satisfactorily, however, without special provisions for flow of the hot plastic material during the molding operation. The present invention resides in a particular swatter design and construction set forth hereinafter and defined in the claims, whereby the dual result is secured of providing the desirable structural features mentioned above in a physical shape such that the corresponding mold space provides for adequate flow of the material and complete filling of the most remote corners and smallest interstices in spite of the necessarily and inherently difficult-to-fill design.

In the drawings:

Fig. 1 is a plan view of a fly swatter of preferred design;

Fig. 2 is a side view of the fly swatter;

Fig. 3 is a section on the line 3—3 of Fig. 1;

Fig. 4 is an enlarged detail of part of the head of the fly swatter; and

Figs. 5 and 6 are sections on the lines 5—5 and 6—6 respectively of Fig. 1.

Referring to the drawings, the two main parts of the swatter are the handle indicated generally at 1 and the head indicated generally at 2. The entire swatter is made in one piece by molding thermoplastic material, preferably nylon plastic, by injection molding or like pressure molding technique. For molding purposes, and also to provide stiffness at the end of the handle and relative flexibility toward and in the head, the thickness of the swatter progressively decreases from the extreme end of the handle to the head, as clearly shown by Fig. 2.

The handle 1 comprises two spaced parallel side members 3 and 4 connected at suitable points throughout their length by cross braces and suitably terminating at their outer ends in a loop 5 which may be used to hang up the device when not in use. Preferably the members 3, 4 are elongated in cross section, having their greatest dimension in a direction perpendicular to the plane of the head, their thickness in a direction parallel to said plane being substantially less. The taper of the handle mentioned above is provided by increasing the extent of elongation of the cross section of the side members toward the outer loop end of the handle. As shown, the cross section of these members is preferably in the shape of a diamond, and at the loop end is elongated to the extent that the long dimension is roughly three times the short dimension of the diamond.

The loop end itself, however, may have any desired thickness. Preferably and as shown, the cross sectional elongation of the side members described above disappears at the loop end, the loop 5 itself being relatively flat and thin. Additional strength may be provided by a thin web 6 and a vertical rib 7.

The cross sectional elongation of the side members 3, 4 near the loop end contributes materially toward the stiffness desired in this portion of the handle for reasons stated above, while the decreasing elongation of the cross section of these side members toward the head results in increasing flexibility of the handle in said perpendicular direction. The cross braces between said side members are preferably arranged to promote these results, and at the same time to provide adequate resistance to collapse of the handle due to bending of the side members inwardly toward one another and/or tilting of either or both side members relative to their normal positions.

A preferred arrangement of cross braces is shown in the drawings. Beginning at the loop end is a series of seven cross braces having the same longitudinal spacing relative to each other. These cross braces also have the cross sectional shape of a perpendicularly elongated diamond, and their relatively close spacing makes for stiffness and rigidity in this grip portion of the handle. However, the perpendicular dimension of some of this series of cross braces may be less than that of the side members, since they still provide stiffness against collapse of the side members whereas the remaining braces of full height prevent tilting of the side members as well as provide stiffness. As shown, every other cross brace 8 of the series has the same perpendicular dimension as the side members 3 and 4 while the intermediate cross braces 9 are only about one-half to two-thirds as high, roughly speaking.

Throughout the remainder of the handle toward the head, the cross braces may be spaced farther apart since as already explained the need for stiffness yields to the desire for flexibility in this section. These cross braces also vary in perpendicular cross sectional elongation for reasons explained above, preferably alternating like the braces 8 and 9. Moreover, since for injection molding under pressure, the inlet of the thermoplastic material should preferably be at or near the midpoint of the length of the mold, it is desirable to have a transverse mold channel connecting the channels of the side members 3 and 4 near the midpoint of the mold space and of sufficient cross sectional size to permit ready flow of the material transversely between said side members and equalization of longitudinal flow in both directions from the point of injection. This can be accomplished advantageously by enlarging the cross section of one of the cross braces. In the drawings, these several results are accomplished by the provision of alternate cross braces 10 which like the cross braces 9 have less perpendicular dimensions than the side members, the intermediate braces 11 and 12 however having the full height of said side members. The brace 11 serves as the transverse mold channel mentioned above, being substantially thicker in cross section as clearly shown in Fig. 3.

The head 2 is composed of a lattice of intersecting filaments disposed at right angles and merging integrally at their intersections, as shown in Fig. 4, the longitudinally extending filaments being indicated at 13 and the transversely extending filaments at 14. At the intersections of these filaments, fillets 15 are preferably provided in each corner in order to relieve stresses in the material.

In order to provide for proper flow of material during the molding operation, certain of the filaments 13 and 14 are of enlarged cross section and act as runners. These include the transversely extending filament 16 which forms the end of the head and with which the side members 3 and 4 merge. During the molding operation, the mold channel which forms the filament 16 is supplied with material through the channels forming the side members 3 and 4, flow through which is facilitated by their less elongated cross section (compare Figs. 5 and 6).

Lateral flow of material along the mold channel of filament 16 is further promoted by channels forming diagonal braces 17 which extend from the side members outwardly to points adjacent the ends of the transverse filament 16 and may be suitably curved as shown. In this way the supply of material available near the ends of the transverse filament 16 is kept approximately equal to that available near its center with the result that approximately equal amounts of thermoplastic material are supplied to the ends of all the parallel longitudinal filaments 13 which extend away from the transverse filament 16 to form the head 2.

In order to assist in filling the channels for the transverse filaments 14, certain of the longitudinal filaments are also enlarged in cross section to act as runners. In the form shown the head 2 has four such longitudinal runners, two of which indicated at 18 form the side edges of the head and not only strengthen it but also carry extra material from the ends of transverse filament 16 down to the ends of the transverse filaments 14. It is in supplying these edge runners 18 that the diagonal braces 17 are especially advantageous. Near the center of the head, and approximately in line with the side members 3 and 4, are two more longitudinal runners 19. Preferably the height of the runners 18 and 19 tapers progressively from the transverse filament 16 to the opposite end of the head.

Thus the design and construction of the fly swatter shown in the drawings not only satisfy the requirements for satisfactory use, but also make it possible to provide a mold space so shaped as to be adapted for the injection molding or other pressure molding technique needed for high quantity, low cost production. The resulting product is not only very satisfactory in use, but also attractive in appearance and at the same time strong and durable, and inexpensive and long-lasting.

It will be understood that reference should be had to the appended claims for a definition of the limits of the invention.

What is claimed is:

1. A fly swatter of thermoplastic material molded integrally into a one-piece structure comprising a substantially rectangular head and a handle extending from one side thereof, said handle comprising spaced parallel side members connected by cross braces and said head comprising a lattice-work of filaments intersecting each other at right angles, the dimensions of said side members in a direction perpendicular to the plane of the head being greatest at a point adjacent the end of the handle and decreasing progressively to the junctures of said side members with that filament transverse to said handle which forms the edge of said head, said transverse filament and the adjoining ends of said side members having substantially the same thickness in said perpendicular direction, and a plurality of transversely spaced longitudinal filaments starting from said transverse filament with said same thickness and extending with progressively decreasing thickness to the opposite free edge of said head, the remaining filaments of said head having a thickness substantially less than that of said transverse filament.

2. A fly swatter as defined in claim 1, two of said longitudinal filaments forming the side edges of said head and at least one longitudinal filament being disposed approximately midway between said side edges.

3. A fly swatter as defined in claim 1 having diagonal braces extending from said side members outwardly to said transverse filament.

4. A fly swatter of thermoplastic material molded integrally into a one-piece structure comprising a substantially rectangular head and a handle extending from one side thereof, said head comprising a network of filaments intersecting each other substantially at right angles, said handle comprising spaced parallel side members having a greater dimension in a direction perpendicular to the plane of said head than in a direction parallel to said plane, the dimensions of said side members in said perpendicular direction being greatest at a point adjacent the end of the handle and decreasing progressively to the junctures of said side members with said head, said side members being joined integrally by a plurality of cross braces spaced along the length of the handle and elongated in cross-sectional shape with their greatest dimensions in said perpendicular direction but not exceeding the corresponding dimensions of said side members.

5. A fly swatter as defined in claim 4, alternate cross braces having approximately the same dimension as said side members in said perpendicular direction and the other cross braces having a substantially decreased dimension in said perpendicular direction.

6. A fly swatter as defined in claim 4, the spacing between cross braces being less at the end of the handle remote from said head and greater adjacent said head.

References Cited in the file of this patent

UNITED STATES PATENTS

| D. 95,447 | Murray | Apr. 30, 1935 |
| 962,869 | Wallis | June 28, 1910 |
| 1,628,486 | Azamber | May 10, 1927 |
| 1,882,291 | Monroe et al. | Oct. 11, 1932 |

FOREIGN PATENTS

| 31,353 | Sweden | Aug. 19, 1911 |